(12) United States Patent
Srinivasan et al.

(10) Patent No.: US 9,864,743 B2
(45) Date of Patent: Jan. 9, 2018

(54) TEXTUAL EMOTION DETECTION

(71) Applicant: FUJITSU LIMITED, Kawasaki-shi, Kanagawa (JP)

(72) Inventors: Ramya Malur Srinivasan, Sunnyvale, CA (US); Ajay Chander, San Francisco, CA (US)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/143,479

(22) Filed: Apr. 29, 2016

(65) Prior Publication Data

US 2017/0315987 A1    Nov. 2, 2017

(51) Int. Cl.
*G06F 17/28* (2006.01)
*G06F 17/30* (2006.01)
*G06F 17/27* (2006.01)
*G06F 17/24* (2006.01)

(52) U.S. Cl.
CPC ............ *G06F 17/28* (2013.01); *G06F 17/241* (2013.01); *G06F 17/279* (2013.01); *G06F 17/30616* (2013.01); *G06F 17/30731* (2013.01)

(58) Field of Classification Search
CPC ....................................................... G06F 17/28
See application file for complete search history.

(56) References Cited

U.S. PATENT DOCUMENTS

| 7,996,210 | B2 | 8/2011 | Godbole et al. | |
|---|---|---|---|---|
| 8,650,094 | B2* | 2/2014 | Cai | G06Q 10/06 705/26.7 |
| 2011/0106743 | A1* | 5/2011 | Duchon | G06F 17/30705 706/46 |
| 2013/0018651 | A1 | 1/2013 | Djordjevie et al. | |
| 2013/0054502 | A1 | 2/2013 | Fano et al. | |
| 2013/0226865 | A1* | 8/2013 | Munemann | G06F 17/30864 707/609 |
| 2014/0074920 | A1* | 3/2014 | Nowak | G06Q 50/01 709/204 |
| 2014/0088944 | A1* | 3/2014 | Natarajan | G06Q 30/02 703/13 |
| 2015/0052084 | A1* | 2/2015 | Kolluru | G06T 13/40 706/11 |
| 2015/0058019 | A1* | 2/2015 | Chen | G10L 13/10 704/260 |
| 2015/0269529 | A1* | 9/2015 | Kyllonen | G06Q 10/1053 705/321 |
| 2015/0286627 | A1 | 10/2015 | Chang et al. | |

(Continued)

OTHER PUBLICATIONS

David M. Blei, Andrew Y. Ng, and Michael I. Jordan. 2002. Latent dirichlet allocation. J. Mach. Learn. Res. 3 (Mar. 2002), 2003.*

(Continued)

*Primary Examiner* — Douglas Godbold
(74) *Attorney, Agent, or Firm* — Maschoff Brennan

(57) ABSTRACT

A method may include receiving a textual input. Topics associated with the textual input and top words associated with each of the topics may be generated by way of Latent Dirichlet Allocation (LDA) topic modeling. Relevance weights may be generated for each emotion associated with the topics generated by the LDA topic modeling. Emotion weights associated with the textual input may be output. The emotion weights may be based, at least in part, on the relevance weights.

20 Claims, 5 Drawing Sheets

(56) References Cited

U.S. PATENT DOCUMENTS

2016/0005395 A1* 1/2016 Williams ............... G06F 3/167
                                                        704/244
2016/0232155 A1* 8/2016 Allen .................... G06F 17/277

OTHER PUBLICATIONS

Cambria, Erik et al., "New Avenues in Opinion Mining and Sentiment Analysis", IEEE Intelligent Systems, vol. 28, Issue 2, Feb. 21, 2013.
A. Kirke, E. Miranda , "Emotional and Multi-agent Systems in Computer-aided Writing and Poetry" Artificial Intelligence and Poetry Symposium, 2013.
Al-Dakkak, O., N. et al, "Emotion Inclusion in an Arabic Text-to-speech." Signal Processing Conference, 2005 13th European, (2005): 1-4. Web. Sep. 4, 2013.
N.Fragopanagos and J. G. Taylor, "Emotion Recognition in Human-Computer Interaction", Neural Networks, vol. 18, Issue 4, Mar. 23, 2005.
Kao, Edward Chao-Chun et al, "Towards Text-based Emotion Detection: A Survey and Possible Improvements," in International Conference on Information Management and Engineering, Apr. 3, 2009.
Frinken, V.; Fischer, A.; Manmatha, R.; Bunke, H. "A Novel Word Spotting Method Based on Recurrent Neural Networks" Pattern Analysis and Machine Intelligence, IEEE Transactions on Year: Feb. 2012, vol. 34, Issue: 2 pp. 211-224.
Carlo Strapparava and Alessandro Valitutti."WordNet-Affect: An Affective Extension of WordNet".In Proceedings of the 4th International Conference on Language Resources and Evaluation (LREC 2004), Lisbon, May 2004, pp. 1083-1086.
Wen, Shiyang, and Xiaojun Wan. "Emotion Classification in Microblog Texts Using Class Sequential Rules." Twenty-Eighth AAAI Conference on Artificial Intelligence. Jul. 7, 2014.
Dung T. Ho, and Tru H. Cao. "A high-order hidden Markov model for emotion detection from textual data." Knowledge Management and Acquisition for Intelligent Systems. Springer Berlin Heidelberg Sep. 5, 2012. 94-105.
Inrak et. Al., "Applying latent semantic analysis to classify emotions in Thai text", Intl. Conf. on Computer Engineering and Technology, vol. 6, Apr. 16, 2010.
Shiv Naresh Shivhare, and Saritha Khethawat. "Emotion Detection from Text", Computer Science and Engineering Applications, May 22, 2012.
"Latent Dirichlet allocation" Wikipedia.org, Retrieved on Apr. 29, 2016, Retrieved From <https://en.wikipedia.org/wiki/Latent_Dirichlet_allocation>.
Singh et al, "Relational Learning via Collective Matrix Factorization," International Conference on Knowledge Discovery and Data Mining, Aug. 24, 2008.
Krcadinac, U., Pasquier, R, Jovanovic, J., & Devedzic, V. (2013). Synesketch: An open source library for sentence-based emotion recognition. IEEE Transactions on Affective Computing, 4(3), 312-325.
European Office Action dated Jul. 26, 2017 in application No. 16205181.7.

* cited by examiner

TEXTUAL EMOTION DETECTION

FIELD

The embodiments discussed herein are related to textual emotion detection.

BACKGROUND

Textual emotion detection systems may be designed to infer the underlying emotion associated with a text. Such systems may be employed in sentiment analysis, computer-assisted creativity, text-to-speech generation, human-computer interactions, and the like. Some conventional textual emotion detection systems may employ a keyword spotting technique. Keyword spotting techniques may include finding occurrences of predefined keywords within a text. The predefined keywords may be pre-associated with particular emotions. Thus, for example, a text may be associated with an emotion should a keyword associated with the emotion be found in the text. The keyword spotting may include word-based, line-based, and document-based keyword spotting.

In an example keyword spotting process, a textual input may be tokenized. Emotion words may be detected by matching the resulting tokens against a predefined set of words. The identified emotion words may be analyzed for their intensity. Furthermore, a negation check may determine whether a negative (e.g., "not") is present in the text and an emotion class may be output.

In a modified approach, which may be described as a lexical affinity technique, a probabilistic affinity may be assigned to arbitrary words rather than detecting pre-defined emotional keywords. The probabilities may be assigned based on linguistic corpora.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method may include receiving a textual input. Topics associated with the textual input and top words associated with each of the topics may be generated by way of Latent Dirichlet Allocation (LDA) topic modeling. Relevance weights may be generated for each emotion associated with the topics generated by the LDA topic modeling. Emotion weights associated with the textual input may be output. The emotion weights may be based, at least in part, on the relevance weights.

The object and advantages of the embodiments will be realized and achieved at least by the elements, features, and combinations particularly pointed out in the claims.

Both the foregoing general description and the following detailed description are exemplary and explanatory and are not restrictive of the claims.

BRIEF DESCRIPTION OF THE DRAWINGS

Example embodiments will be described and explained with additional specificity and detail through the use of the accompanying drawings.

DESCRIPTION OF EMBODIMENTS

Figure 1:
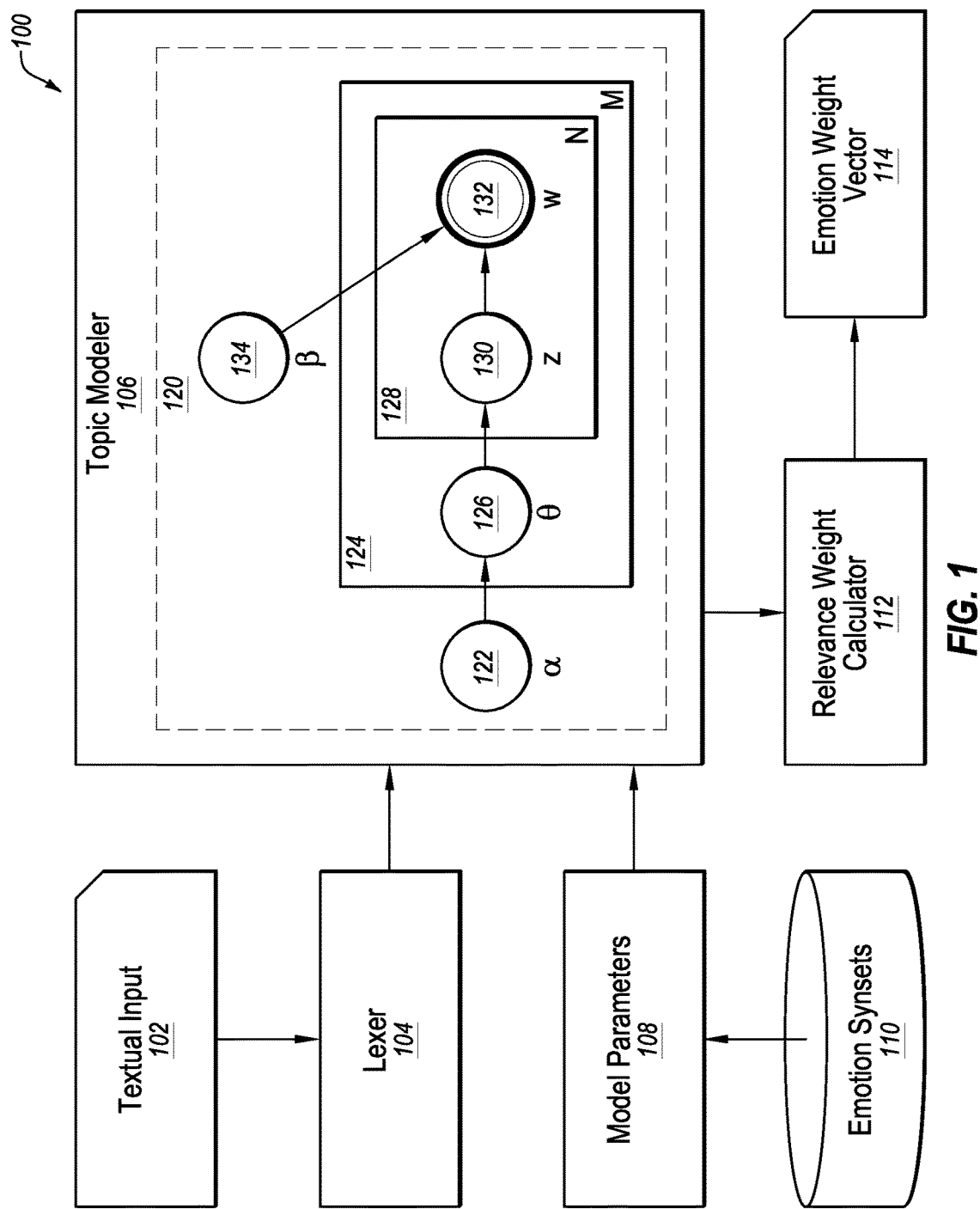
FIG. 1 illustrates a diagram of an example text emotion detection system.

Keywords spotting- and/or lexical affinity-based textual emotion detection may fix keywords with certain pre-defined, static meanings that may resist dynamic alterations based on context. For example, the word "accident" may be assigned a high probability of indicating a negative emotion, but may not contribute correctly to an emotional assessment of a phrase such as "the new element was discovered by accident," which may be associated with a negative emotion although it may actually convey a positive emotion. Keywords may have multiple meanings that may depend on the context in which the keywords are used. The keywords spotting- and/or lexical affinity-based textual emotion detection may not consider linguistic information, such as syntax structure and/or semantics that may influence the emotion of the text. For example, the phrases "John laughed at him" and "he laughed at John" may convey different emotions from a reader's perspective. Alternately or additionally, lexical affinity-based textual emotion detection may be biased towards the corpus-specific information. That is, the probabilities assigned to the words may be dependent on the corpus.

Learning-based textual emotion detection may include supervised methods employing training classifiers on a corpus of data, described as "training data." Based on the training, emotions may be recognized in new data, described as "test data." Support vector machines (SVM) or decision trees may be employed. For example, a conventional SVM-based approach may employ word features, punctuation features, and emotion lexicon features for multi-class emotion classification. Other conventional approaches may include the use of hidden Markov models or the use of latent semantic analysis. Such approaches may lack sufficient emotion detection features, which may result in relatively poor emotion associations.

Embodiments described herein may include textual emotion detection systems and methods that may rank words of a text in proportion to their relevance to an emotion and a topic or content. The textual emotion detection may facilitate automatic and unsupervised identification of the top words in a text excerpt. For example, embodiments may facilitate automatic estimations of underlying emotion independent of system training via emotion-specific information or content. Some embodiments may employ some portions of Latent Dirichlet Allocation (LDA) based topic modeling in identifying the top words of the text excerpt.

The textual emotion detection may be context-sensitive. For example, the relative relevance of the topics of a text may be identified. Alternately or additionally, the top words of the text may be ranked with respect to relevance to a topic, the context, and/or an emotion.

Embodiments may facilitate relatively improved emotion detection accuracy relative to conventional systems. That is, embodiments may offer improvements in the technological area of textual emotion detection, as well as sentiment analysis, computer-assisted creativity technologies, text-to-speech generation technologies, human-computer interaction technologies, machine-translation technologies, document search technologies, or the like.

By way of example, and not of limitation, embodiments may be employed in applications such as virtual assistants, patient treatment, social behavior analysis, or the like. Virtual assistants may employ embodiments described herein to create emotionally intelligent virtual assistants or agents. Patient treatment systems may employ embodiments described herein to facilitate understanding of patients' emotional well-being in developing and implementing treatment plans. The emotional states identified by textual emotion detection systems may be influenced in part on the system application.

Embodiments will be explained with reference to the accompanying drawings.

FIG. 1 illustrates a diagram of an example text emotion detection system 100. The system 100 may include a textual input 102. The textual input 102 may include one or more phrases, sentences, paragraphs, and/or documents or the like or any combination thereof. The textual input 102 may include test data.

The system 100 may include a lexer 104, which may include a lexical processor. The lexer 104 may receive the textual input 102. In some embodiments, the lexer 104 may perform spelling correction on the textual input 102. Alternately or additionally, the lexer 104 may remove stop words of the textual input 102. The stop words may include function/structure words, conjunctions, prepositions, articles, or the like or any combination thereof.

Thus, for example, the lexer 104 may generate a clean text based on the textual input 102. The clean text may be submitted to a topic modeler 106 of the system 100. In some embodiments, the topic modeler 106 may perform LDA on the textual input 102 and/or on the clean text from the lexer 104. The topic modeler 106 may alternately or additionally perform other topic modeling configured to generate topics and/or top words associated with the textual input 102.

In some embodiments, the LDA performed by the topic modeler 106 may be based at least in part on model parameters 108. The model parameters 108 may include a vocabulary based on emotion synonym sets (synsets) of an emotion synsets database 110.

The emotion synsets 110 may be generated by identifying word sets of synonyms for each emotion of a set of emotions. By way of example, emotions may include "love," "hate," "happy," "angry," "surprise," "sad," "scared," "optimistic," "pessimistic," "interested," "uninterested," "worried," "lonely," or the like or any combination thereof. By way of further example, a synset for "happy" may include "happy," "joy," "delight," "bliss," "glad," "thrilled," "elated," "merry," "jubilant," "pleased," "ecstatic," "joyous," or the like or any combination thereof. By way of yet further example, a synset for "love" may include "love," "affection," "attachment," "adore," "fondness," "amity," "liking," "warmth," "fondle," or the like or any combination thereof.

The model parameters 108 may further include a number of iterations to be performed by the topic modeler 106, a number of topics to be identified by the topic modeler 106, Bayesian hyperparameters, such as a hyperparameter for topic proportions, or the like or any combination thereof. The model parameters 108 may be used to configure the LDA and/or other topic modeling to be performed by the topic modeler 106.

In some embodiments, the topic modeler 106 may perform LDA. The LDA may automatically discover topics of the textual input 102 and/or the clean text from the lexer 104.

In some embodiments, a topic mixture for the textual input 102 may be selected. The topic mixture may be selected according to a prior Dirichlet distribution over a fixed set of K topics. By way of example, if two topics are selected, the textual input 102 may be selected to consist of 50% of each topic.

The LDA may generate each word in the textual input 102 and/or the clean text from the lexer 104 by selecting a topic. For example, a first topic with 50% probability may be selected. The topic may then be used to generate the word itself according to the first topic's distribution. By way of example, the first topic may output the word "worried" with 40% probability, or the like. Where such a generative model may be employed for a collection of documents, the LDA and/or other topic modeling may backtrack from the documents to identify a set of topics associated with the collection of documents.

The LDA may be represented by an LDA plate notation diagram 120. Documents such as the textual input 102 and/or the clean text generated by the lexer 104 from the textual input 102 may be represented as random mixtures over latent topics. Each topic may be characterized by a distribution over words. Parameter $\alpha$ 122 may represent a parameter of the Dirichlet prior on per-document topic distributions. Parameter $\beta$ 134 may represent a parameter of the Dirichlet prior on per-topic word distribution. Parameter $\theta\_i$ 126, located on outermost plate 124, may represent topic distribution for document i. Parameter M may represent a number of documents. Parameter $z\_ij$ 130, located on innermost plate 128, may represent the topic for the j-th word in document i. Parameter $w\_ij$ 132 may represent the j-th word in document i. Parameter N may represent a number of words.

The LDA may employ a generative process for a corpus including M documents each having a length of $N\_i$. The parameter $\theta\_i$ may be chosen so $\theta\_i \sim Dir(\alpha)$, where i$\in$ $\{1, 2, \ldots M\}$ and $Dir(\alpha)$ represents the Dirichlet distribution for the parameter $\alpha$. For each of the word positions, a topic $z\_ij$ may be chosen so $z\_ij \sim Multinomial(\theta\_i)$, and a word $w\_ij$ may be chosen so $w\_ij \sim Multinomial(\omega\_k)$. Parameter $\omega\_k$ may represent a word distribution for topic k. The parameter $\omega\_k$ may be chosen so $\omega\_k \sim Dir(\beta)$.

In some embodiments, the various parameters may be a problem of Bayesian inference and may be solved via collapsed Gibbs sampling. Collapsed Gibbs sampler may integrate out one or more of the variables when sampling for some other variable. For example, a model may include three variables A, B, and C. A simple Gibbs sampler may sample from p(A|B,C), then p(B|A,C), and then p(C|A,B). By way of example, a collapsed Gibbs sampler may replace the sampling of A with a sample taken from the marginal distribution p(A|C), where variable B may be integrated out in this case.

By way of example, the topic modeler 106 may receive the following sentences, which may be included in the textual input 102.

Sentence 1: "John needs rest as he is stressed."
Sentence 2: "It is common to get tired after a long day."
Sentence 3: "There is no need to worry if bored."
Sentence 4: "Try watching movie when bored."
Sentence 5: "Try muscle relaxation when stressed."
Sentence 6: "Take a shower when tired."

The topic modeler 106 may further receive instructions, which may be received via the model parameters 108, to identify three topics from the sentences. The topic modeler 106 may employ LDA and may generate the following sentence-to-topic mapping.

"Sentence 1 is 100% topic 1."
"Sentence 2 is 100% topic 2."
"Sentence 3 and 4 are 100% topic 3."
"Sentence 5 is 75% topic 1 and 25% topic 3."
"Sentence 6 is 100% topic 2."

Furthermore, the topic modeler 106 and the employed LDA may generate the following topics, which may list the top words arranged according to a relative ranking of the top words for each of the topics.

"Topic 1 is about stressed, rest, relaxation."
"Topic 2 is about tired, shower."
"Topic 3 is about bored, worry."

Thus, for example, the top words for topic 1 may be "stressed," "rest," and "relaxation," where "stressed" may have a rank of first, "rest" may have a rank of second, and "relaxation" may have a rank of third. The top words for topic 2 may be "tired" and "shower" and the top words for topic 3 may be "bored" and "worry." The top words of topics 2 and/or 3 may be ranked in a manner similar to the top words of topic 1.

The system 100 may include a relevance weight calculator 112. The relevance weight calculator 112 may receive the top words for various topics from the topic modeler 106. The top words received by the relevance weight calculator 112 may be ranked. The relevance weight calculator 112 may weigh the top words based on the relevance of the top words to emotions to generate an emotion weight vector 114. The emotion weight vector 114 may describe the emotions of the textual input 102. Furthermore, the emotion weight vector 114 may describe the emotions of the textual input 102 more accurately than LDA may alone. In some embodiments, the emotion weight vector 114 may include a normalized emotion weight vector, which may represent normalized proportions of the emotions associated with the textual input 102.

Figure 2:
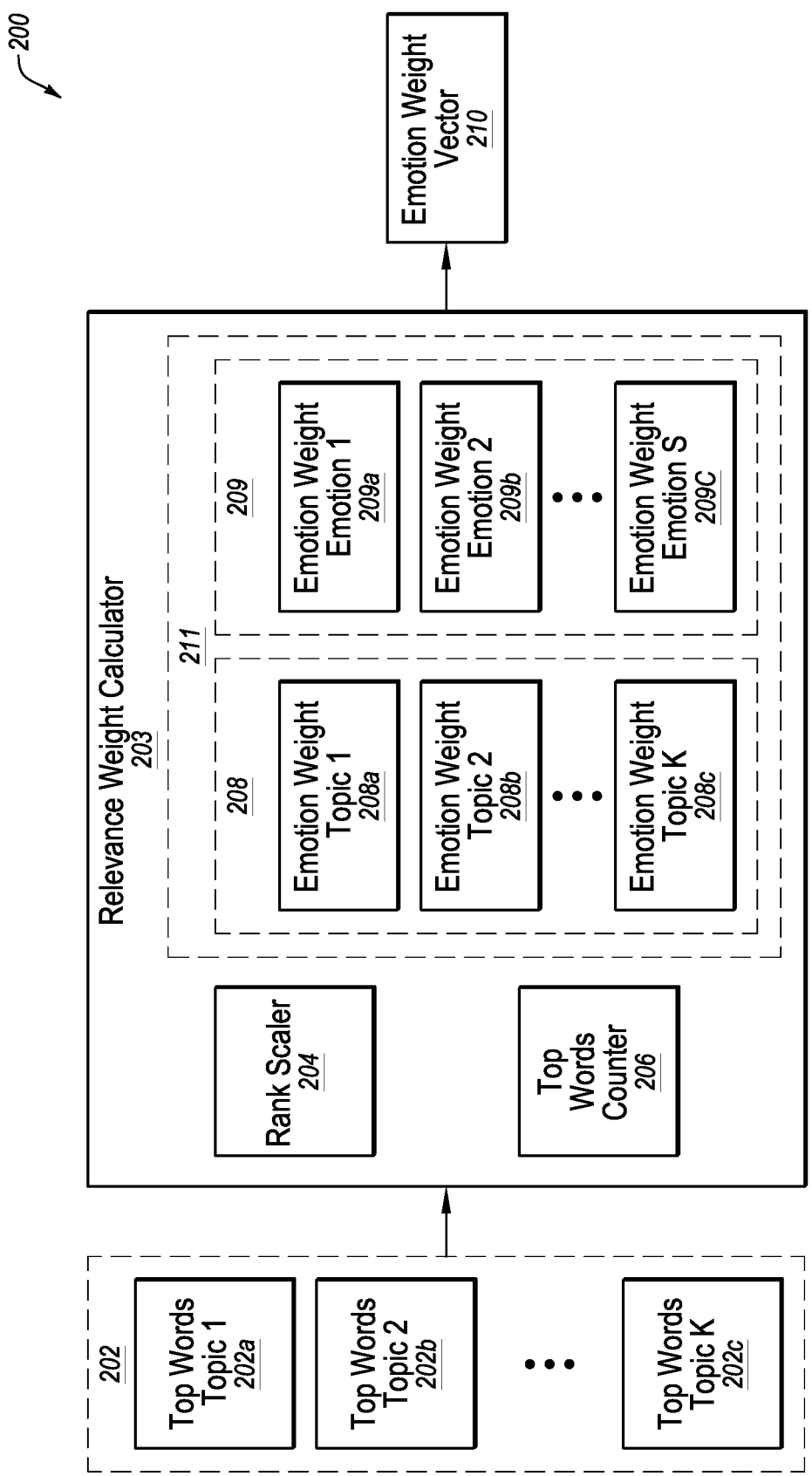
FIG. 2 illustrates a diagram of an emotion weight vector calculator.

FIG. 2 illustrates a diagram of an emotion weight vector calculator 200. The emotion weight vector calculator 200 may include a relevance weight calculator 203, which may generally correspond to the relevance weight calculator 112 of FIG. 1. The relevance weight calculator 203 may include a rank scaler 204 and a top words counter 206. The relevance weight calculator 203 may receive top words 202 associated with a textual input, which may generally correspond to the textual input 102 of FIG. 1.

The top words 202 may generally correspond to top words output by the topic modeler 106 of FIG. 1. Multiple topics may be associated with the textual input. For example, the top words 202 may include top words 202a associated with a first topic, top words 202b for a second topic, through top words 202c for a K-th topic. The top words 202c for the K-th topic may be represented by the set T_K according to the following equation.

$$T_K = \{t_K^1, t_K^2, \ldots t_K^r\}$$ eq. 1

Where $t^i\_K$ represents the i-th top word in the K-th topic. The number of top words of the topic K common with the full emotion vocabulary may be represented by N_K. The number of top words common with the emotion E in the vocabulary may be represented by $N^E\_K$. In some embodiments, having relatively more words associated with a particular topic may indicate that the particular topic may be relatively more relevant.

The relevance weight calculator 203 may assign scalars to individual top words of a topic. In some embodiments, the scalars may be assigned in an inverse manner represented by the following equation.

$$\text{Scalar}(t_K^j) = \frac{1}{j} * N_K$$ eq. 2

Where j may be represented according to the following expression such that a relatively higher rank word may be assigned a relatively higher scalar and thus, for example, a relatively higher weight.

$$j \in \{1, 2, \ldots N_K\}$$ eq. 3

For example, a highest top word may be assigned a scalar of N_K, a second-highest top word may be assigned a scalar of ½ N_K, a third-highest top word may be assigned a scalar of ⅓ N_K, and so on. Employing N_K as a scalar base may encourage relatively higher combined and/or individual scalar values for top words associated with topics having relatively higher numbers of top words, which may correspond to topics associated with a relatively higher relevance. In some embodiments, other rank scales may be used. For example, a highest top word may be assigned a scalar of 1, a second-highest top word may be assigned a scalar of ½, a third-highest top word may be assigned a scalar of ⅓, and so on.

The relevance weight calculator 203 may calculate emotion weights by topic 208. For example, the relevance weight calculator 203 may calculate weights associated with an emotion E, which may be represented by $w^E\_K$ according to the following equation.

$$w_K^E = \Sigma_j \text{Scalar}(t_K^j)$$ eq. 4

Where the summation over j may be from 1 to $N^E\_K$.

By way of example, the emotion weights by topic 208 may include an emotion weight associated with the first topic 208a, an emotion weight associated with the second topic 208b, through an emotion weight associated with a K-th topic 208c.

In this and other embodiments, the relevance weight calculator 203 may calculate emotion weights by emotion 209. For example, the relevance weight calculator 203 may calculate a net weight associated with an emotion E across all K topics, which may be represented by E_w. The emotion weights by emotion 209 may be calculated according to the following equation.

$$E_w = \Sigma_K w_K^E$$ eq. 5

By way of example, the emotion weights by emotion 209 may include an emotion weight associated with a first emotion 209a, an emotion weight associated with a second emotion 209b, through an emotion weight associated with an S-th emotion 209c, where S may represent a total number of emotion states being considered. The emotion weights by topic 208 and the emotion weights by emotion 209 may be described generally as emotion weights 211.

The relevance weight calculator 203 may further calculate a normalized emotion weight vector 210, represented by D_v, according to the following equation.

$$D_v = \frac{1}{\sum_{e=[1:S]} E_w^e} * [E_w^1, E_w^2, \ldots E_w^S]$$ eq. 6

The normalized emotion weight vector 210 may generally correspond to the emotion weight vector 114 of FIG. 1. The relevance weight calculator 203 may output the emotion weight vector 210. Alternately or additionally, the relevance weight calculator 203 may output the emotion weights by emotion 209 and/or the emotion weights by topic 208.

Figure 3:
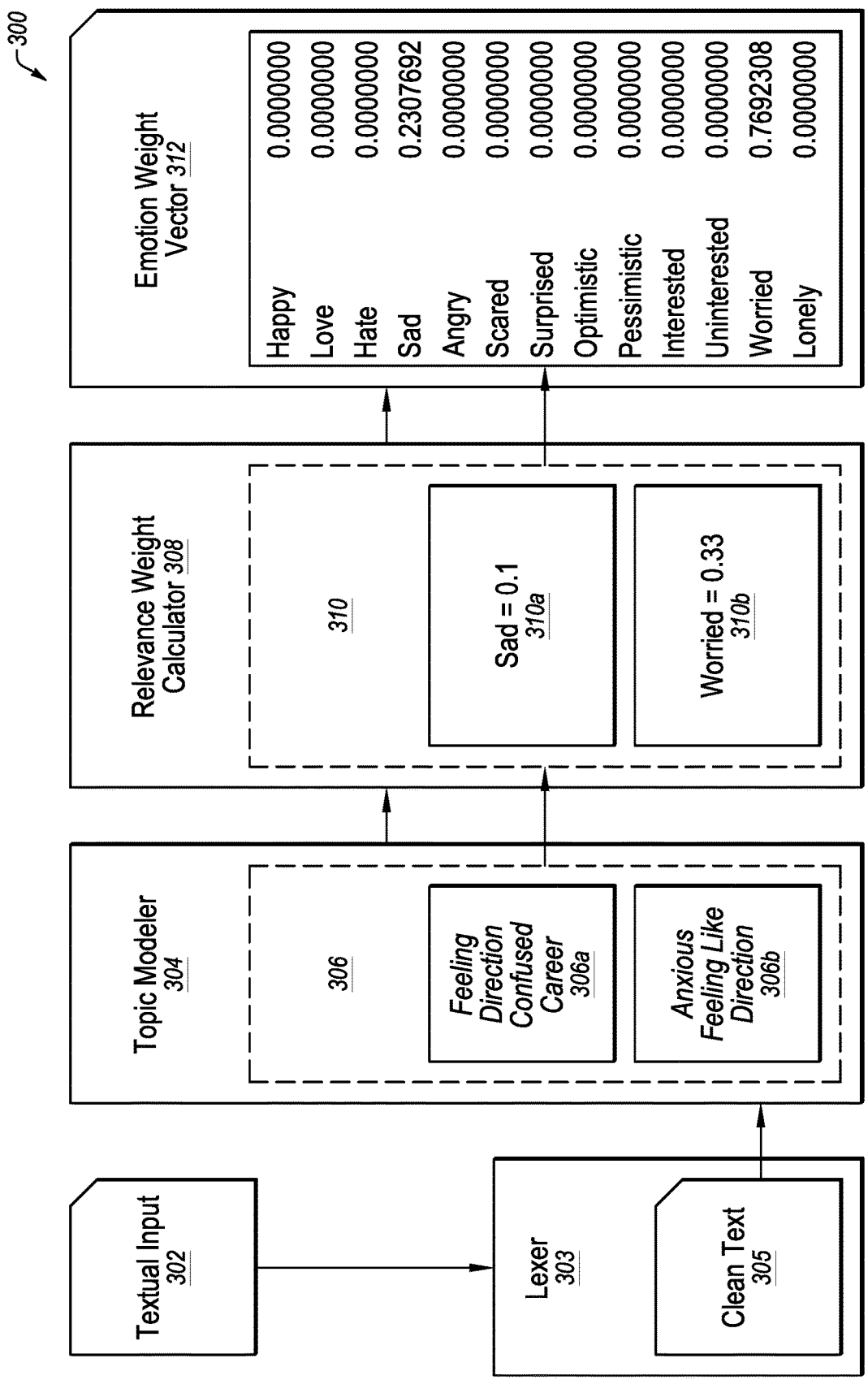
FIG. 3 illustrates an example text emotion detection process.

FIG. 3 illustrates an example text emotion detection process 300. The process 300 may generate an emotion weight vector 312 from a textual input 302. The textual input 302 may generally correspond to the textual input 102 of FIG. 1. By way of example, the textual input 302 may include the following text: "I'm feeling like I have no direction and I'm confused about what to do with my career. I'm also anxious and feel like I have nothing to offer, so it's hard for me to get motivated."

The textual input 302 may be received by a lexer 303. The lexer may generally correspond to the lexer 104 of FIG. 1. The lexer 303 may generate a clean text 305 from the textual input 302. By way of example, the clean text may include the following text: "feeling like direction confused career also anxious feel like nothing offer hard get motivated."

The clean text 305 may be received by a topic modeler 304. The topic modeler 304 may generally correspond to the topic modeler 106 of FIG. 1. The topic modeler 304 may employ a LDA topic modeler. The topic modeler 304 may generate top words 306 from the textual input 302. For example, the topic modeler 304 may generate top words associated with a first topic 306a and top words associated with a second topic 306b. By way of example, the top words associated with the first topic 306a may include the following words: "feeling, direction, confused career." The top words associated with the second topic 306b may include the following words: "anxious, feeling, like, direction." Alternately or additionally, the topic modeler 304 may generate document-to-topic mapping and/or sentence-to-topic mapping for the clean text 305 and/or the textual input 302.

The top words 306 may be received by a relevance weight calculator 308. The relevance weight calculator 308 may generally correspond to the relevance weight calculator 112 of FIG. 1 and the relevance weight calculator 203 of FIG. 2. The relevance weight calculator 308 may generate emotion weights by emotion 310 for emotions in each of the first and second topics. For example, the relevance weight calculator 308 may generate an emotion weight 310a of 0.1 for the emotion "sad" and an emotion weight 310b of 0.333 for the emotion "worried." In this and other embodiments, the emotion weights by emotion 310 may be calculated via the above equations 1-5.

The relevance weight calculator 308 may calculate the emotion weight vector 312 from the emotion weights 310. For example, the relevance weight calculator 308 may calculate the emotion weight vector 312 via the above equation 6. The relevance weight calculator 308 may output the emotion weight vector 312.

Figure 4:
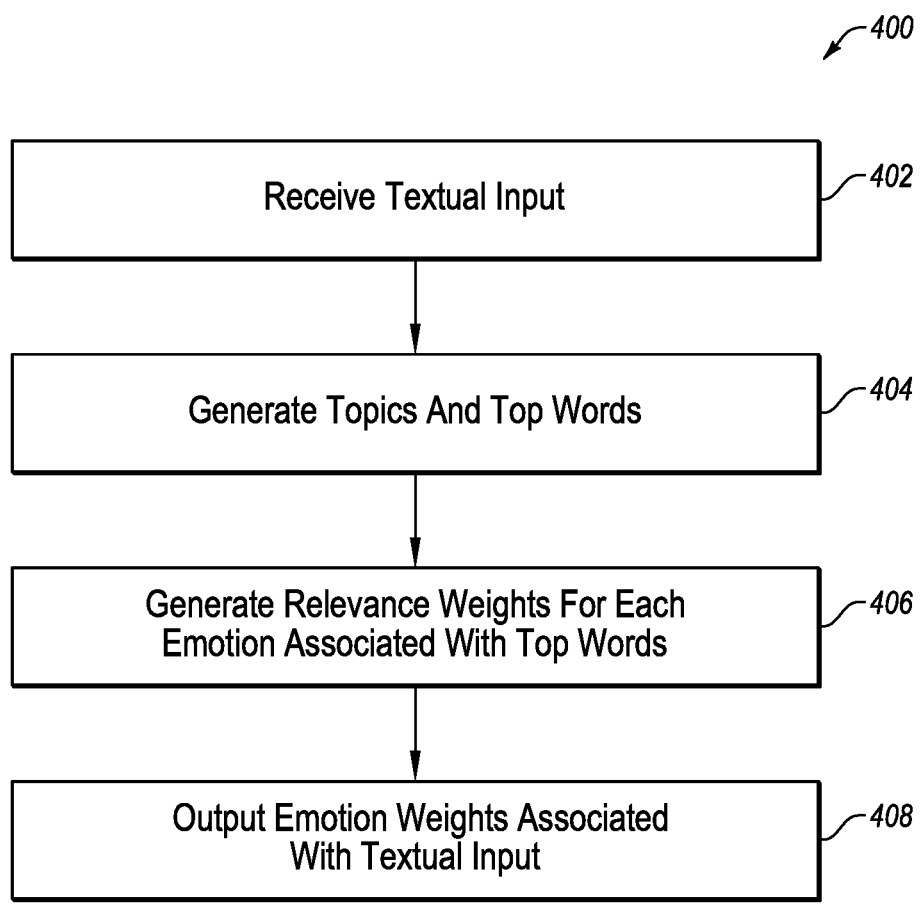
FIG. 4 is a flowchart of an example method.

FIG. 4 is a flowchart of an example method 400. The method 400 may begin at block 402 by receiving a textual input. The textual input may generally correspond to the textual input 102 of FIG. 1 and/or the textual input 302 of FIG. 3.

The method 400 may continue to block 404 by generating topics and top words. The topics may be associated with the received textual input. The top words may be associated with each of the topics. In some embodiments, the top words associated with each of the topics may be arranged according to a ranking of the top words. The top words may generally correspond to the top words 202 of FIG. 2 and/or the top words 306 of FIG. 3. In some embodiments, the topics and/or the top words may be generated by a topic modeler generally corresponding to the topic modeler 106 of FIG. 1 and/or the topic modeler 304 of FIG. 3.

In some embodiments, the topics and top words may be generated by way of LDA topic modeling. In some embodiments, the LDA topic modeling may be performed according to model parameters, which may generally correspond to the model parameters 108 of FIG. 1. The model parameters may include a vocabulary. The vocabulary may be based on emotion synsets, which may generally correspond to the emotion synsets 110 of FIG. 1. Alternately or additionally, the model parameters may include a number of topics for the LDA to identify.

The method 400 may continue to block 406 by generating relevance weights for each emotion associated with the top words. In some embodiments, generating the relevance weights may include assigning a scalar to each of the top words according to a relative rank of the top word. Alternately or additionally, generating the relevance weights may include calculating emotion weights by topic, which may generally correspond to the emotion weights by topic 208 of FIG. 2. The emotion weights by topic may be calculated based on the scalars assigned to the top words. Alternately or additionally, generating the relevance weights may include calculating emotion weights by emotion, which may generally correspond to the emotion weights by emotion 209 of FIG. 2. The emotion weights by emotion may be calculated based on the emotion weights by topic.

The method 400 may continue to block 408 by outputting emotion weights associated with the textual input. The emotion weights may be based on the relevance weights. In some embodiments, the emotion weights may include the emotion weights by emotion.

For this and other processes and methods disclosed herein, the functions performed in the processes and methods may be implemented in differing order. Furthermore, the outlined operations are provided only as examples, and some of the operations may be optional, combined into fewer operations, or expanded into additional operations without detracting from the essence of the embodiments.

For example, in some embodiments, the method 400 may further include generating a normalized emotion weight vector, which may generally correspond to the emotion weight vector 114 of FIG. 1, the normalized emotion weight vector 210 of FIG. 2, and/or the emotion weight vector 312 of FIG. 3. In some embodiments, the output emotion weights may include the normalized emotion weight vector.

The method 400 may alternately or additionally include performing lexical processing on the textual input to generate a clean text associated with the textual input.

Figure 5:
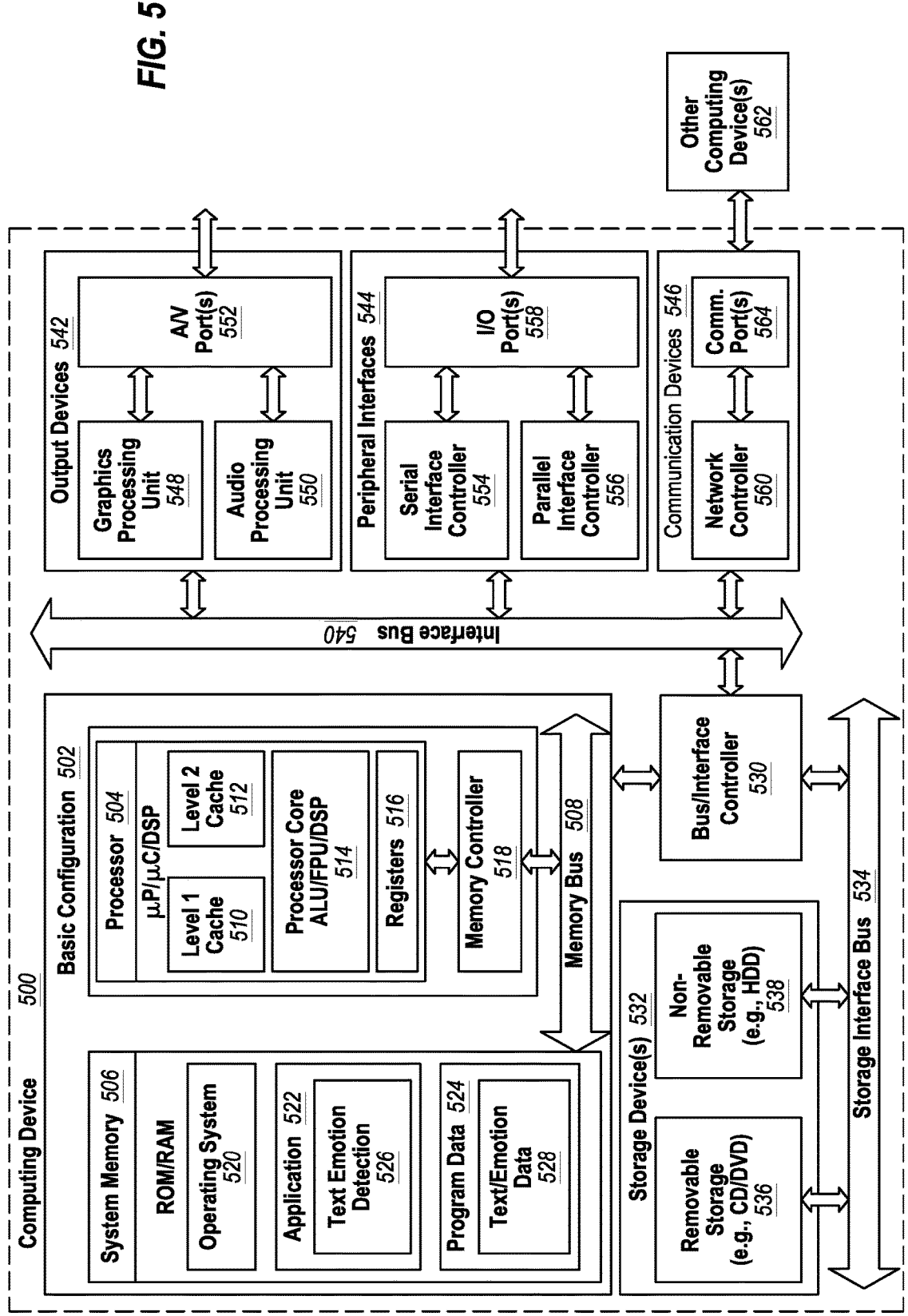
FIG. 5 illustrates a diagram of an example computing device.

FIG. 5 illustrates a diagram of an example computing device 500. The computing device 500 may be arranged to detect textual emotion in accordance with the present disclosure. The computing device 500 may be one example of an embodiment of the system 100 of FIG. 1 and/or an embodiment of the emotion weight vector calculator 200 of FIG. 2. In a configuration 502, the computing device 500 typically includes one or more processors 504 and a system memory 506. A memory bus 508 may be used for communicating between the processor 504 and the system memory 506.

Depending on the desired configuration, the processor 504 may be of any type including but not limited to a microprocessor (µP), a microcontroller (µC), a digital signal processor (DSP), or any combination thereof. The processor 504 may include one more levels of caching, such as a level one cache 510 and a level two cache 512, a processor core 514, and registers 516. An example processor core 514 may include an arithmetic logic unit (ALU), a floating point unit (FPU), a digital signal processing core (DSP Core), or any combination thereof. An example memory controller 518 may also be used with the processor 504, or in some implementations the memory controller 518 may be an internal part of the processor 504.

Depending on the desired configuration, the system memory 506 may be of any type including but not limited to volatile memory, such as Random Access Memory (RAM); non-volatile memory, such as Read Only Memory (ROM), flash memory, etc.; or any combination thereof. The system memory 506 may include an operating system 520, one or more applications 522, and program data 524. The application 522 may include a text emotion detection algorithm 526 that may be arranged to perform the functions as described herein including those described with respect to the system 100 of FIG. 1, the emotion weight vector calculator 200 of FIG. 2, the process 300 of FIG. 3, and the method 400 of FIG. 4. The program data 524 may include text/emotion data 528 such as may be included in the textual input 102, model parameters 108, emotion synsets 110, and/or emotion weight vector 114 of FIG. 1; the top words 202, emotion weights by topic 208, emotion weights by emotion 209, and/or the normalized emotion weight vector 210 of FIG. 2; and/or the textual input 302, clean text 305, top words 306, emotion weights 310, and/or emotion weight vector 312 of FIG. 3 and that may be useful for operation with the text emotion detection algorithm 526 as is described herein. In some embodiments, the application 522 may be arranged to operate with the program data 524 on the operating system 520 such that textual emotion detection may be provided as described herein.

The computing device 500 may have additional features or functionality, and additional interfaces to facilitate communications between the basic configuration 502 and other devices and interfaces. For example, a bus/interface controller 530 may be used to facilitate communications between the basic configuration 502 and one or more data storage devices 532 via a storage interface bus 534. The data storage devices 532 may be removable storage devices 536, non-removable storage devices 538, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 506, the removable storage devices 536, and the non-removable storage devices 538 are examples of computer storage media. Computer storage media includes, but is not limited to, RAM, ROM, Electronically Erasable and Programmable Read Only Memory (EEPROM), flash memory or other memory technology, Compact Disc-Read Only Memory (CD-ROM), digital versatile disks (DVD) or other optical storage, magnetic cassettes, magnetic tape, magnetic disk storage or other magnetic storage devices, or any other medium which may be used to store the desired information and which may be accessed by computing device 500. Any such computer storage media may be part of computing device 500.

Computing device 500 may also include an interface bus 540 for facilitating communication from various interface devices (e.g., output devices 542, peripheral interfaces 544, and communication devices 546) to the basic configuration 502 via the bus/interface controller 530. Example output devices 542 include a graphics processing unit 548 and an audio processing unit 550, which may be configured to communicate to various external devices such as a display or speakers via one or more A/V ports 552. Example peripheral interfaces 544 include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more input/output (I/O) ports 558. An example communication device 546 includes a network controller 560, which may be arranged to facilitate communications with one or more other computing devices 562 over a network communication link via one or more communication ports 564.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 500 may be implemented as a portion of a small-form factor portable (or mobile) electronic device such as a cell phone, a tablet computer, a smartphone, a smartwatch, smart glasses, a personal data assistant (PDA), a personal media player device, a wireless web-watch device, a personal headset device, an application specific device, or a hybrid device that include any of the above functions. The computing device 500 may also be implemented as a personal computer including both laptop computer and non-laptop computer configurations.

As used herein, the terms "modeler," "lexer," "calculator," "scaler" and/or "counter" (collectively, "modules") may refer to specific hardware implementations configured to perform the operations of the modules and/or software objects or software routines that may be stored on and/or executed by the computing device 500. In some embodiments, the different modules described herein may be implemented as a part of the application 522 and/or the text emotion detection algorithm 526. For example, the lexer 104, the topic modeler 106, and/or the relevance weight calculator 112 of FIG. 1; the relevance weight calculator 203, the rank scaler 204, and/or the top words counter 206 of FIG. 2; and/or the lexer 303, the topic modeler 304, and/or the relevance weight calculator 308 of FIG. 3 may be implemented by computer-executable instructions stored in the system memory 506 and executed by the processor 504. While some of the system and methods described herein are generally described as being implemented in software, specific hardware implementations or a combination of software and specific hardware implementations are also possible and contemplated.

All examples and conditional language recited herein are intended for pedagogical objects to aid the reader in understanding the embodiments and the concepts contributed to furthering the art, and are to be construed as being without limitation to such specifically recited examples and conditions. Although embodiments have been described in detail, it should be understood that the various changes, substitutions, and alterations could be made hereto without departing from the scope of the embodiments.

What is claimed is:

1. A method comprising:
receiving a textual input;
generating, by way of Latent Dirichlet Allocation (LDA) topic modeling, topics associated with the textual input and top words associated with each of the topics;
determining a relative ranking of each top word with respect to other top words that correspond to a same topic in which the relative ranking is based on a determined relevance of the respective top word with respect to its corresponding topic;
determining relationships of the top words with respect to a vocabulary of emotion synonym sets that includes word sets of synonyms that are associated with emotions of a set of emotions;
determining emotion weights associated with the textual input that indicate a relationship between the topics and one or more emotions and that are based on the relative rankings of the top words and the relationships of the top words with respect to the vocabulary of emotion synonym sets; and
performing an action in response to the textual input in which the action is determined based on the textual input and the emotion weights, the action including one or more of: a computer-based sentiment analysis of the textual input, text-to-speech generation of the textual input, a machine-translation of the textual input, and search based on the textual input.

2. The method of claim 1, further comprising performing lexical processing on the textual input to generate a clean text associated with the textual input and generating the topics associated with the textual input based on the clean text.

3. The method of claim 1, wherein the LDA topic modeling is performed according to model parameters that include the vocabulary of emotion synonym sets.

4. The method of claim 1, wherein the LDA topic modeling is performed according to model parameters including a number of topics for the LDA to identify.

5. The method of claim 1, further comprising assigning a scalar to each of the top words according to the relative rank of the respective top word and according to the relationship of the respective top word with respect to the vocabulary of emotion synonym sets.

6. The method of claim 5, wherein determining the emotion weights includes determining one or more emotion weights by topic based on a sum of the scalars assigned to the top words of the respective topic.

7. The method of claim 6, wherein determining the emotion weights includes determining one or more emotion weights by emotion based on the emotion weights by topic.

8. The method of claim 7, further comprising generating a normalized emotion weight vector representing normalized proportions of each emotion associated with the textual input, the normalized emotion weight vector based on the one or more emotion weights by emotion, and wherein the emotion weights include the normalized emotion weight vector.

9. A non-transitory computer-readable medium having encoded therein programming code executable by a processor to perform operations comprising:
receiving a textual input;
generating, by way of Latent Dirichlet Allocation (LDA) topic modeling, topics associated with the textual input and top words associated with each of the topics;
determining relationships of the top words with respect to a vocabulary of emotion synonym sets that includes word sets of synonyms that are associated with emotions of a set of emotions;
determining emotion weights associated with the textual input that indicate a relationship between the topics and one or more emotions and that are based on the relationships of the top words with respect to the vocabulary of emotion synonym sets; and
performing an action in response to the textual input in which the action is determined based on the textual input and the emotion weights, the action including one or more of: a computer-based sentiment analysis of the textual input, text-to-speech generation of the textual input, a machine-translation of the textual input, and search based on the textual input.

10. The computer-readable medium of claim 9, wherein the LDA topic modeling is performed according to model parameters that include the vocabulary of emotion synonym sets.

11. The computer-readable medium of claim 9, wherein the LDA topic modeling is performed according to model parameters including a number of topics for the LDA to identify.

12. The computer-readable medium of claim 9, wherein the operations further comprise:
determining a relative ranking of each top word with respect to other top words that correspond to a same topic in which the relative ranking is based on a determined relevance of the respective top word with respect to its corresponding topic; and
assigning a scalar to each of the top words according to the relative rank of the respective top word and according to the relationship of the respective top word with respect to the vocabulary of emotion synonym sets.

13. The computer-readable medium of claim 12, wherein determining the emotion weights includes determining one or more emotion weights by topic based on a sum of the scalars assigned to the top words of the respective topic.

14. The computer-readable medium of claim 13, wherein determining the emotion weights includes determining one or more emotion weights by emotion based on the emotion weights by topic.

15. The computer-readable medium of claim 14, wherein the operations further comprise generating a normalized emotion weight vector representing normalized proportions of each emotion associated with the textual input, the normalized emotion weight vector based on the emotion weights by emotion, and wherein the emotion weights include the normalized emotion weight vector.

16. A method comprising:
receiving a textual input;
generating topics associated with the textual input and top words associated with each of the topics;
determining relationships of the top words with respect to a vocabulary of emotion synonym sets that includes word sets of synonyms that are associated with emotions of a set of emotions;
determining emotion weights associated with the textual input that indicate a relationship between the topics and one or more emotions and that are based on the relationships of the top words with respect to the vocabulary of emotion synonym sets; and performing an action in response to the textual input in which the action is determined based on the textual input and the emotion weights, the action including one or more of: a computer-based sentiment analysis of the textual input, text-to-speech generation of the textual input, a machine-translation of the textual input, and search based on the textual input.

17. The method of claim 16, further comprising:
determining a relative ranking of each top word with respect to other top words that correspond to a same topic in which the relative ranking is based on a determined relevance of the respective top word with respect to its corresponding topic; and
assigning a scalar to each of the top words according to the relative rank of the respective top word and according to the relationship of the respective top word with respect to the vocabulary of emotion synonym sets.

18. The method of claim 17, wherein determining the emotion weights includes determining one or more emotion weights by topic based on a sum of the scalars assigned to the top words of the respective topic.

19. The method of claim 18, wherein determining the emotion weights includes determining one or more emotion weights by emotion based on the emotion weights by topic.

20. The method of claim 19, further comprising generating a normalized emotion weight vector representing normalized proportions of each emotion associated with the textual input, the normalized emotion weight vector based on the one or more emotion weights by emotion, and wherein the emotion weights include the normalized emotion weight vector.

* * * * *